(12) United States Patent
Blum

(10) Patent No.: US 8,797,654 B2
(45) Date of Patent: Aug. 5, 2014

(54) ELECTROACTIVE OPTICAL DEVICE

(75) Inventor: Mark Blum, Cham (CH)

(73) Assignee: Optotune AG, Dubendorf (CH)

( * ) Notice: Subject to any disclaimer, the term of this patent is extended or adjusted under 35 U.S.C. 154(b) by 675 days.

(21) Appl. No.: 13/002,021

(22) PCT Filed: Jul. 29, 2009

(86) PCT No.: PCT/CH2009/000266
§ 371 (c)(1),
(2), (4) Date: Feb. 10, 2011

(87) PCT Pub. No.: WO2010/015095
PCT Pub. Date: Feb. 11, 2010

(65) Prior Publication Data
US 2011/0149410 A1    Jun. 23, 2011

(30) Foreign Application Priority Data

Aug. 8, 2008 (CH) .................. PCT/CH2008/000338

(51) Int. Cl.
*G02B 3/14* (2006.01)
(52) U.S. Cl.
USPC ......................................... 359/666
(58) Field of Classification Search
USPC .......................... 359/665, 666, 667
See application file for complete search history.

(56) References Cited

U.S. PATENT DOCUMENTS

| | | | |
|---|---|---|---|
| 2,062,468 A | 12/1936 | Matz | |
| 3,942,048 A | 3/1976 | Laude et al. | |
| 4,494,826 A | 1/1985 | Smith | |
| 4,572,616 A | 2/1986 | Kowel et al. | |
| 4,783,152 A | 11/1988 | Nishimoto | |
| 4,783,153 A | 11/1988 | Kushibiki et al. | |
| 4,783,155 A | 11/1988 | Imataki et al. | |
| 4,802,746 A | 2/1989 | Baba et al. | |
| 5,138,494 A | 8/1992 | Kurtin | |
| 5,212,583 A | 5/1993 | Vali et al. | |

(Continued)

FOREIGN PATENT DOCUMENTS

| | | |
|---|---|---|
| EP | 1 816 493 A1 | 8/2007 |
| EP | 1 826 591 A1 | 8/2007 |

(Continued)

OTHER PUBLICATIONS

Abbass et al., "An improved electroactive polymer for optical applications," *Proc. of SPIE*, 5385:449-453 2004.

(Continued)

*Primary Examiner* — Scott J Sugarman
(74) *Attorney, Agent, or Firm* — Marshall, Gerstein & Borun LLP

(57) ABSTRACT

An electroactive optical device, in particular an electroactive lens, comprising an optical element (1) as well as an electroactive element (2) is described. The optical element (1) is an elastic solid, such as a gel or a polymer. The electroactive element (2) comprises a plurality of compliant electrodes (3a-3e) stacked on top of each other with an electroactive material (5) between them. The electroactive element (2) is surrounded by a rigid wall (4a, 4b), which provides two common contacts for the electrodes (3a-3e). In the absence of an applied electric voltage, the optical element (1) is in a mechanically relaxed State, which reduces undesired ageing effects. Upon application of a voltage to the electrodes (3a-3e) the optical element (2) is deformed.

20 Claims, 5 Drawing Sheets

(56) References Cited

U.S. PATENT DOCUMENTS

| | | | |
|---|---|---|---|
| 5,446,591 A | 8/1995 | Medlock | |
| 5,999,328 A | 12/1999 | Kurtin et al. | |
| 6,184,609 B1 | 2/2001 | Johansson et al. | |
| 6,538,823 B2 | 3/2003 | Kroupenkine et al. | |
| 6,715,876 B2 | 4/2004 | Floyd | |
| 6,812,624 B1 | 11/2004 | Pei et al. | |
| 6,859,333 B1 | 2/2005 | Ren et al. | |
| 6,864,951 B1 | 3/2005 | Ren et al. | |
| 6,930,817 B2 | 8/2005 | Srinivasan et al. | |
| 7,079,203 B1 | 7/2006 | Huang et al. | |
| 7,085,065 B2 | 8/2006 | Silver | |
| 7,209,280 B2 | 4/2007 | Goossens | |
| 7,643,217 B2 | 1/2010 | Yokoyama et al. | |
| 7,672,059 B2 | 3/2010 | Batchko et al. | |
| 7,675,686 B2 | 3/2010 | Lo et al. | |
| 7,697,214 B2 | 4/2010 | Batchko et al. | |
| 7,768,712 B2 | 8/2010 | Silver et al. | |
| 7,826,145 B2 | 11/2010 | Justis et al. | |
| 2002/0102102 A1* | 8/2002 | Watanabe et al. | 396/89 |
| 2002/0118464 A1 | 8/2002 | Nishioka et al. | |
| 2002/0154380 A1 | 10/2002 | Gelbart | |
| 2003/0147046 A1 | 8/2003 | Shadduck | |
| 2004/0001180 A1 | 1/2004 | Epstein | |
| 2004/0008853 A1 | 1/2004 | Pelrine et al. | |
| 2004/0174610 A1 | 9/2004 | Aizenberg et al. | |
| 2005/0030438 A1 | 2/2005 | Nishioka | |
| 2005/0100270 A1 | 5/2005 | O'Connor et al. | |
| 2006/0061729 A1 | 3/2006 | Shadduck | |
| 2006/0074325 A1 | 4/2006 | Karo et al. | |
| 2006/0087614 A1 | 4/2006 | Shadduck | |
| 2006/0164593 A1 | 7/2006 | Peyghambarian et al. | |
| 2006/0164731 A1 | 7/2006 | Wu et al. | |
| 2007/0263293 A1 | 11/2007 | Batchko et al. | |
| 2008/0112059 A1 | 5/2008 | Choi et al. | |
| 2008/0144185 A1 | 6/2008 | Wang et al. | |
| 2008/0204909 A1 | 8/2008 | Shiota et al. | |
| 2008/0259463 A1 | 10/2008 | Shepherd | |
| 2009/0052049 A1 | 2/2009 | Batchko et al. | |
| 2009/0161239 A1 | 6/2009 | Verhaar et al. | |
| 2009/0195861 A1* | 8/2009 | Jendbro et al. | 359/315 |
| 2009/0303613 A1 | 12/2009 | Kinoshita et al. | |
| 2009/0310209 A1 | 12/2009 | Aschwanden et al. | |
| 2010/0091389 A1 | 4/2010 | Henriksen et al. | |
| 2010/0118414 A1 | 5/2010 | Bolis | |
| 2010/0202054 A1 | 8/2010 | Niederer | |
| 2010/0232030 A1 | 9/2010 | Dobrusskin | |
| 2011/0032624 A1 | 2/2011 | Bolis et al. | |

FOREIGN PATENT DOCUMENTS

| | | |
|---|---|---|
| JP | 1-166003 A | 6/1989 |
| JP | 1-166004 A | 6/1989 |
| JP | 10-144975 A | 5/1998 |
| JP | 11-133210 A | 5/1999 |
| JP | 2000081504 A | 3/2000 |
| JP | 2002357774 A | 12/2002 |
| JP | 2008058841 A | 3/2008 |
| WO | WO-2005/040909 A1 | 5/2005 |
| WO | WO-2005/085930 A1 | 9/2005 |
| WO | WO-2010/015095 A1 | 2/2010 |
| WO | WO-2010/078666 A1 | 7/2010 |

OTHER PUBLICATIONS

Aschwancien et al., "Polymeric, electrically tunable diffraction grating based on artificial muscles," *Optics Letters*, 31(17):2610-2612 (2006).

Ashley, "Liquid Zoom," *Scientific American*, p. 15 (2007).

Beadie et al., "Tunable polymer lens," *Optics Express*, 16(16)11847-11857 (2008).

Graham-Rowe, "Liquid lenses make a splash," *Nature Photonics*, pp. 2-4 (2006).

Jungmann et al., "Miniaturised Electrostatic Tactile Display With High Structural Compliance," *Institute of Electromechanical Design*.

Mirfakhrai et al., "Polymer artificial muscles," *Materials Today*, 10(4):30-38 (2007).

Pelrine et al., "High-Speed Electrically Actuated Elastomers With Strain Greater Than 100%," *Science*, 287:836-839 (2000).

Schlaak et al., "Novel Multilayer Electrostatic Solid-State Actuators With Elastic Dielectric," *Proc. of SPIE*, 5759:121-133 (2005).

Schneider et al., "Adaptive Fluidic PDMS-Lens With Integrated Piezoelectric Actuator," *IEEE*, pp. 120-123 (2008).

Seemann et al., Local Surface Charges Direct the Deposition of Carbon Nanotubes and Fullerenes into Nanoscale Patterns, *Nano Lett*, 7(10):3007-3012 (2007).

Syms, R., "Surface Tension-Powered Self-Assembly of Microstructures—The State-of-the-Art," *Jour. of Microelectromechanical Systems,*, 12(4):387-417 (2003).

Ulvensoen, J., "We are now poLight," *poLight AS*, Jan. 10, 2008.

Written Opinion for PCT/CH2009/000266, dated Feb. 8, 2011.

Zhang et al., "Fluidic adaptive lends with high focal length tunability," *Applied Physics Letters*, 82(19):3171-3172 (2003).

* cited by examiner

ELECTROACTIVE OPTICAL DEVICE

This application is the United States national phase of International Patent Application No. PCT/CH2009/000266, filed Jul. 29, 2009, which claims priority to International Patent Application No. PCT/CH2008/000338 filed Aug. 8, 2008. The priority applications PCT/CH2009/000266 and PCT/CH2008/000338 are hereby incorporated by reference.

TECHNICAL FIELD

The invention relates to an electroactive optical device, in particular an electroactive lens, as well as to a method for manufacturing such a device.

BACKGROUND ART

An electroactive optical device is an optical device whose shape can be changed using the electroactive effect. In particular, an electroactive optical lens is a lens whose focal length can be changed using the electroactive effect.

The term electroactive effect describes an electric-field induced deformation of a solid or liquid. The deformation can be due to Coulomb forces between electrodes and/or due to the rearrangement of electrical ions and/or multipoles, in particular dipoles, in an electric field. Examples of electroactive materials are: dielectric elastomers, electrostrictive relaxor ferroelectric polymers, piezoelectric polymers (PVDF), liquid crystal elastomers (thermal), ionic polymer-metal composites, mechano-chemical polymers/gels.

A variety of electroactive lens designs have been known.

WO 2008/044937, for example, describes a device where a circularly shaped piezoelectric crystal is bending a thin glass cover, thereby providing a shift of focal length of the lens assembly. Devices based on piezoelectric crystals are, however, comparatively expensive to manufacture.

WO 2005/085930 relates to an adaptive optical element that can be configured e.g. as a biconvex lens. The lens consists of a polymer actuator comprising an electroactive polymer layer and layer electrodes. Applying a voltage in the order of 10 kV or more leads to a deformation of the polymer layer, which, in turn, leads to a direct deformation of the lens. Due to the high voltage required to control this device, it is poorly suited for many applications.

Also, prior art devices of these types often show ageing effects that degrade their properties over time.

Finally, a variety of devices using liquid filled lenses are known. These devices suffer from a plurality of drawbacks. In particular, they are susceptible to distortions due to external forces, such as acceleration, gravitational effects or vibrations.

DISCLOSURE OF THE INVENTION

Hence, it is a general object of the invention to provide a device of this type that is reliable and that overcomes at least part of the mentioned shortcomings.

This object is achieved by the electroactive device of claim 1. Accordingly, the device comprises an elastic optical element as well as an electroactive element arranged laterally adjacent to the optical element. The electroactive element comprises at least one electrode pair with an elastic electroactive material, advantageously a dielectric elastomer, arranged between the electrodes of the electrode pair. When a voltage is applied over the electrode pair, the axial distance between the electrodes of the electrode pair changes, i.e. it increases or decreases, thereby elastically varying the volume (i.e. the axial extension) of a first region in the optical element adjacent to the electrode pair. This, in turn, leads to a radial displacement of material in the optical element between said first region and a second region. One of said regions elastically expands in axial direction, while the other elastically contracts. In the absence of a voltage over the electrode pair, the optical element is in a mechanically relaxed state.

By varying the axial extension of the two regions and thereby radially displacing material of the optical element, a strong change of the curvature of the surface of the optical element can be achieved.

This design uses the advantages of an electroactive actuator, such as its potentially easy manufacturing process, large deformations and low actuation voltage, while providing a solution that has a long lifetime because, in the absence of a voltage, the device is in an elastically relaxed state and therefore is less prone to fatigue than devices where the device is formed by a pre-strained solid and is therefore under continuous strain.

Advantageously, the application of the voltage will lead to a decrease of the distance between the electrodes, which in turn will reduce the volume of said first region of the optical element. Additionally, the compressed electroactive material between the electrodes can exert a lateral pressure onto the optical element. The combination of both effects brings the optical element into a strongly deformed state.

In most cases, the above effects will lead to an increase of the thickness of the optical element upon application of a voltage to the electrode pairs.

Advantageously, the electroactive element comprises a plurality of electrode pairs stacked on top of each other, with gaps between the electrode pairs. The gaps are advantageously filled by the electroactive material. This design allows to obtain a large volume displacement of material in the optical element using low drive voltages.

In a further aspect of the invention, it is an object to provide an efficient manufacturing method for such a device. This object is achieved by the second independent claim. Accordingly, the method comprises the following steps:

a) providing a plurality of first electrodes, b) applying, over said first electrodes, a layer of electroactive material, c) applying a plurality of second electrodes over said first electrodes, with each second electrode attributed to a first electrode, and d) separating a resulting assembly of said steps a), b) and c) into a plurality of said electroactive devices.

As can be seen, this process allows to simultaneously form a plurality of the devices with common steps a), b) and c), which reduces manufacturing costs.

Advantageously, steps b) and c) are repeated in order to form a plurality of electrode pairs stacked on top of each other in order to manufacture devices that can be controlled with low voltages.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Definitions

The term "axial" is generally used to designate a direction perpendicular to the surface of the center region of the optical element in its relaxed state. If a substrate is present, the substrate will in most cases be aligned perpendicularly to the axial direction.

The term "radial" is used to designate a direction perpendicular to the axial direction.

Introduction

The present invention can be implemented in a variety of forms, e.g. as an electroactive lens, a beam deflector or an anti-jittering device. In the following, we describe some of these applications.

Electroactive Lenses

Figure 1:
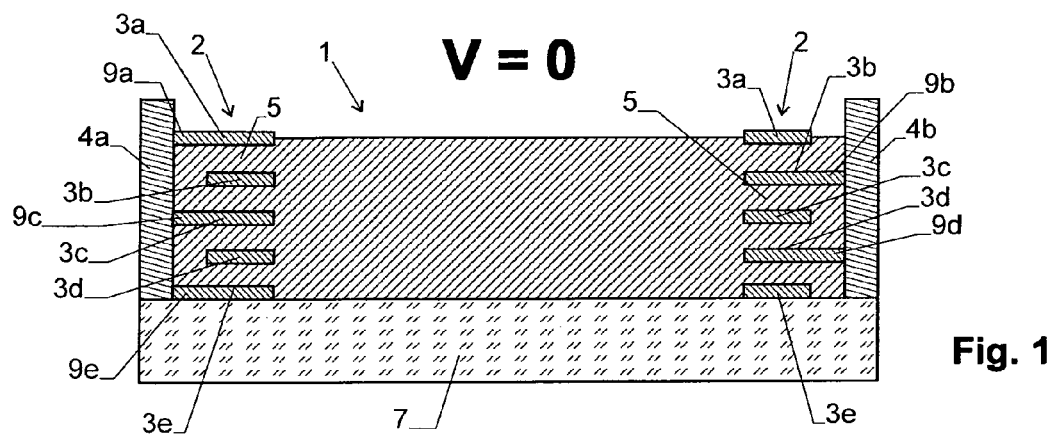
FIG. 1 is a sectional view of a lens without applied voltage.
Figure 2:
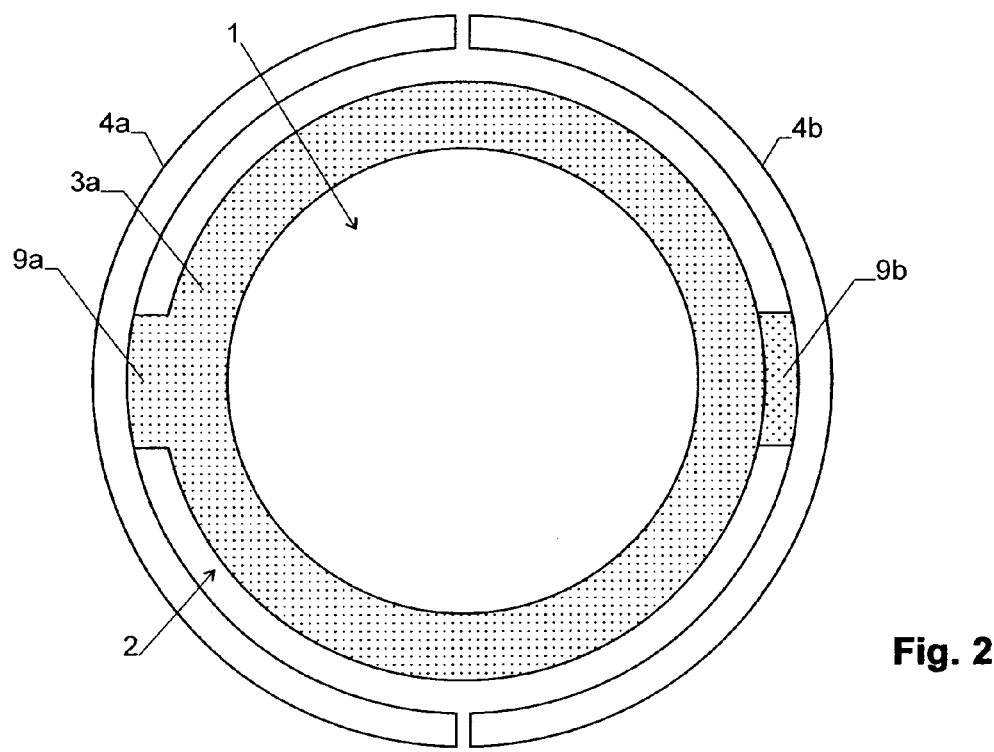
FIG. 2 is a top view of the lens of FIG. 1.

One possible embodiment of the present invention as an electroactive lens is shown in FIGS. 1 and 2. The lens comprises an elastic optical element 1 and an electroactive element 2. In the present embodiment, the optical element 1 is circular and the electroactive element 2 surrounds the optical element. However, as mentioned below, the present invention can also be implemented for non-circular lenses, e.g. cylindrical lenses, as long as electroactive element 2 is laterally adjacent to at least one side of optical element 1.

Electroactive element 2 comprises at least two, advantageously more than two, vertically stacked electrodes 3a-3e forming at least one electrode pair, advantageously several electrode pairs on top of each other.

The first, topmost electrode 3a is, by means of a lead 9a, electrically connected to a first section 4a of a side wall, while the second, next electrode 3b is connected to a second section 4b of the side wall by means of a lead 9b, the third electrode 3c is again connected to first section 4a by means of a lead 9c, the fourth electrode 3d to second section 4b by means of a lead 9d, etc, such that adjacent electrodes are connected to different sections of the side wall. The side wall is electrically conducting and it is of a solid material, such as a conductive polymer. When a voltage difference is applied over the two sections 4a, 4b of the side wall, the same voltage difference is applied over each neighboring pair of the electrodes 3a-3e.

An electroactive material 5 is located in the gaps between the electrodes 3a-3e, i.e. all the gaps between the electrodes are filled by the electroactive material 5. An electroactive material is any material that, when a voltage is applied between neighboring electrodes, yields to the Maxwell stress caused by the Coulomb forces between the electrodes. Advantageously, electroactive material 5 is a solid, such as a dielectric elastomer, or a gel.

Optical element 1 of the lens can be of the same material as electroactive material 5—this simplifies the manufacturing process, as described below. However, optical element 1 may also be of a material different from electroactive material 5, which allows to optimize the physical properties of optical element 1 and electroactive element 2 independently.

Optical element 1 is a transparent elastic solid or a gel and, in the absence of a voltage applied to the electrodes 3a-3e, it is in a mechanically relaxed state for the reasons mentioned above. Advantageously, it is made from a single piece of material.

Figure 3:
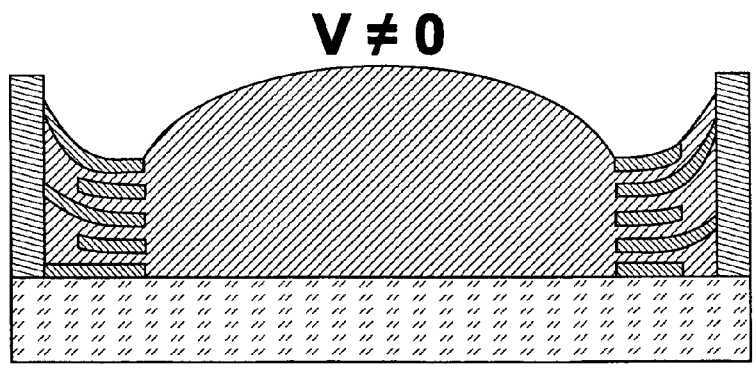
FIG. 3 is the lens of FIG. 1 with applied voltage.
Figure 4:
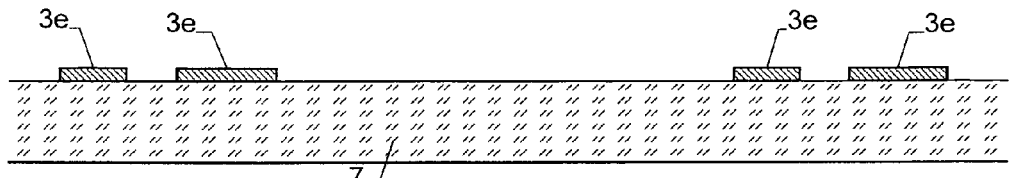
FIG. 4 is a first step in a manufacturing process.
Figure 5:
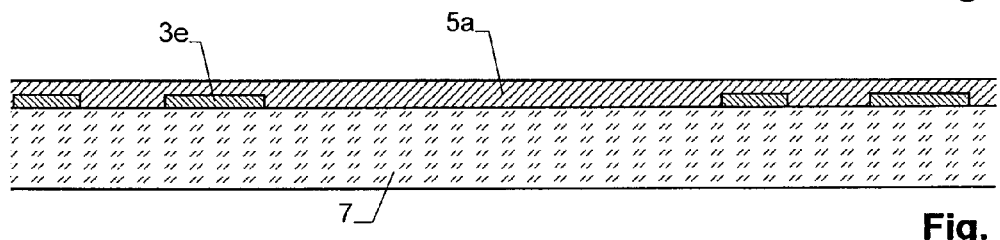
FIG. 5 is a second step in a manufacturing process.

The function of the lens of FIGS. 1 and 2 is shown in reference to FIG. 3. As can be seen, when a non-zero voltage V is applied over all neighboring electrode pairs formed by the electrodes 3a-3e, the Coulomb forces between the electrodes and/or a rearrangement of multipoles within the material lead to a decrease or an increase of the axial distance between the electrodes, depending on the electroactive material that is used. In particular, liquid crystal elastomers can be engineered to expand in the direction of an applied field, while most other materials will contract.

If the electroactive material contracts upon application of the field, the thickness of the electroactive element 2 is decreased. Since the electroactive element 2 is laterally joined to the optical element 1, a compressed first region is created in the optical element adjacent to the electrodes. This, in turn, leads to a radial displacement of material of the optical element 1 away from the compressed first region, typically towards the center of the optical element 1. This, in turn, forms an axially expanding second region in the optical element due to the incompressibility of the material. In FIG. 3, this axially expanding region is in the center of optical element 2.

If the electroactive material expands along the applied field, the thickness of the electroactive element 2 is increased, and the first region of the optical element 1 expands in axial direction, while the second region contracts.

Hence, the application of the voltage to the electrodes leads to a redistribution of material within optical element 1, which in turn affects the curvature of its surface. In particular, due to the boundary conditions imposed by the contracting electroactive element, the optical element 1 becomes thinner in the regions adjacent to those electrodes where the voltage has been applied, while it becomes thicker elsewhere.

Depending on the thickness and volume of the optical element 1 as well as the electroactive element 2, one contribution to the deformation of the optical element 1, if the distance between the electrodes decreases, is provided by the fact that, upon application of the voltage, the electroactive material 5 between them is compressed. This compression is translated into a lateral expansion of the material (constant volume approximation), which leads to a flow of material from the electroactive element 2 into the optical element 1, thereby making the optical element 1 thicker and, advantageously, more voluminous. In particular if wall 4a, 4b is a solid, advantageously rigid, ring, the lateral expansion is directed inwards and exerts a pressure on the elastic material of optical element 1, which results in a deformation of its surface. As shown in FIG. 3, if the relaxed surface (FIG. 1) is originally flat, the deformation causes the surface to bulge outwards, thereby forming a convex lens surface, which affects the focal length of the lens formed by optical part 1.

As mentioned, the present lens is not necessarily a circular lens. It may, as mentioned, e.g. also be cylindrical. In this case, optical element 1 is formed by an elongate strip of transparent, elastic material, with at least one elongate electroactive element 2 arranged along at least one side thereof, such that electroactive element 2 can create a compressed or expanded first region in the optical element 1 adjacent to the electrodes, as mentioned above. Also in this case it is advantageous to locate a solid wall at the second (opposite) side of the electroactive element 2 in order to prevent the electroactive material 5 from yielding in that direction, thereby directing the whole voltage-induced displacement of material towards optical element 1.

As can be seen from FIGS. 1-3, the lens advantageously comprises a solid, transparent substrate 7, with the electroactive element 2 and the optical element 1 arranged thereon. Such a substrate provides mechanical stability to the device and simplifies the manufacturing process as described below. However, if optical element 1 has sufficient mechanical stability, substrate 7 can also be dispensed with.

The distance between adjacent electrodes 3a-3e should not be too large in order to obtain strong Coulomb forces even if the applied voltage is small. Advantageously, the distance between two neighboring electrodes should be less than 250 µm, in particular approximately 10 µm, and it should be small enough to allow significant deformations at voltages below 1 kV.

Figure 11:
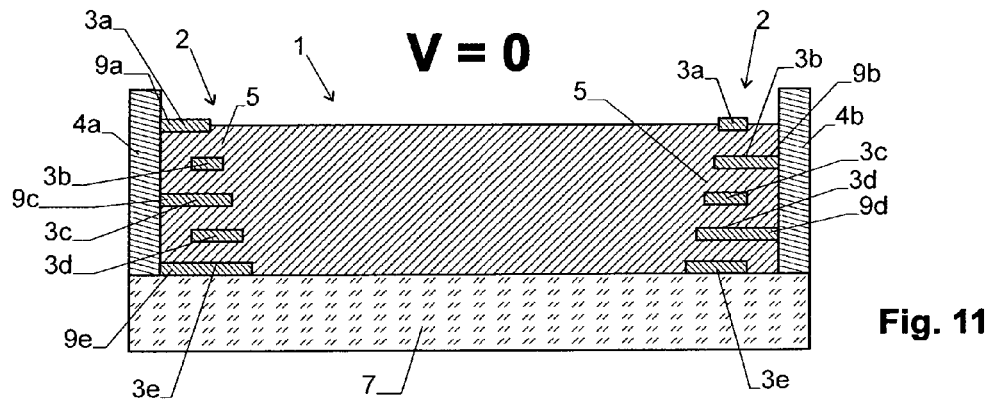
FIG. 11 is a view of a lens with graded electrodes.

The electrodes should be compliant, i.e. they should be able to follow the deformations of electroactive element 2 without being damaged. Advantageously, the electrodes are therefore manufactured from one of the following materials:

- Carbon nanotubes (see "Self-clearable carbon nanotube electrodes for improved performance of dielectric elastomer actuators", Proc. SPIE, Vol. 6927, 69270P (2008);)
- Carbon black (see "Low voltage, highly tunable diffraction grating based on dielectric elastomer actuators", Proc. SPIE, Vol. 6524, 65241N (2007);)
- Carbon grease
- Ions (Au, Cu, Cr, . . . ) (see "Mechanical properties of electroactive polymer microactuators with ion-implanted electrodes", Proc. SPIE, Vol. 6524, 652410 (2007);)
- Fluid metals (e.g. Galinstan)
- Metallic powders, in particular metallic nanoparticles (Gold, silver, copper)
- Conductive polymers
- Rigid electrodes connected to deformable leads The material for optical element 1 and the electroactive material 5 for electroactive element 2 can e.g. comprise or consist of:

- Gels (Optical Gel OG-1001 by Liteway),
- Elastomers (TPE, LCE, Silicones e.g. PDMS Sylgard 186, Acrylics, Urethanes)
- Thermoplaste (ABS, PA, PC, PMMA, PET, PE, PP, PS, PVC, . . . )
- Duroplast The geometries of the electrodes 3a-3e do not necessarily have to be identical. FIG. 11 shows an advantageous embodiment where the electrodes 3a-3e have increasingly larger inner diameter towards the surface of the device. In other words, at least the electrode 3a closest to the top surface has a larger inner diameter than the next lower electrode. (In this context, "top surface" designates the surface of the lens that is deformed upon application of a voltage.)

This design reduces the mechanical strain in the electroactive material 5 as well as in the material of the optical element 1 upon application of a voltage.

In more general terms, the inner diameter of at least one of the electrodes 3a-3e can be different from the inner diameter of at least some of the other electrodes. This allows a more refined control of the deformation of optical element 1.

In the following, an advantageous manufacturing process is described by reference to FIGS. 4 to 8. In this process, a plurality of electroactive lenses is manufactured at the same time on a common wafer. The common wafer may be pre-shaped e.g. to comprise fixed structures, such as rigid lenses, to be combined with the optical elements 2.

The process starts (step a, FIG. 4) from substrate 7, which originally has a size much larger than an individual lens. The bottommost electrodes 3e for a plurality of adjacent lenses are deposited on the substrates. Any suitable method can be used for manufacturing these electrodes, as long as it is compatible with the electrode material and the substrate, such as sputtering with subsequent masking and etching.

Now (step b, FIG. 5), a layer 5a of the electroactive material 5 is applied over substrate 7. The layer 5a may e.g. have a thickness of 10 µm.

In a next step (step c, FIG. 6), a plurality of second electrodes, namely the electrodes 3d, are applied over the layer 5a of electroactive material. The electrodes 3d are in register with the electrodes 3e, with one electrode 3d attributed to each electrode 3e.

Figure 6:
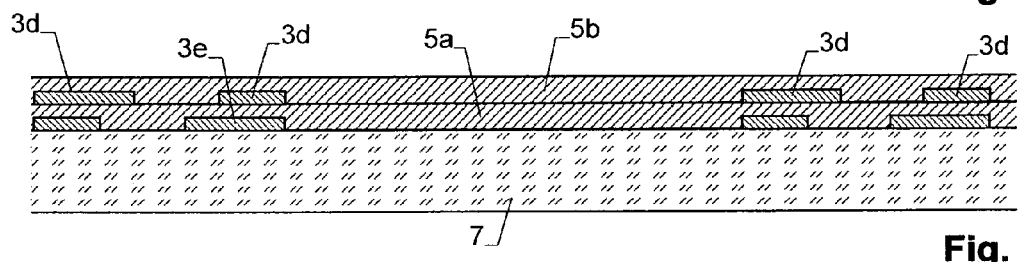
FIG. 6 is a third step in a manufacturing process.
Figure 7:
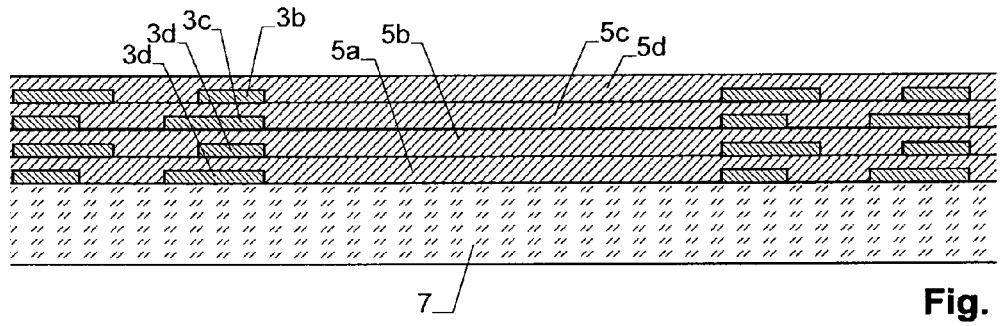
FIG. 7 is a fourth step in a manufacturing process.

Then, step b is repeated, i.e. a further layer 5b of the electroactive material is applied as shown in FIG. 6, whereupon step c is repeated, etc., until a stacked structure of sufficient height with a plurality of stacked electrode pairs on top of each other is manufactured, as shown in FIG. 7.

Figure 8:
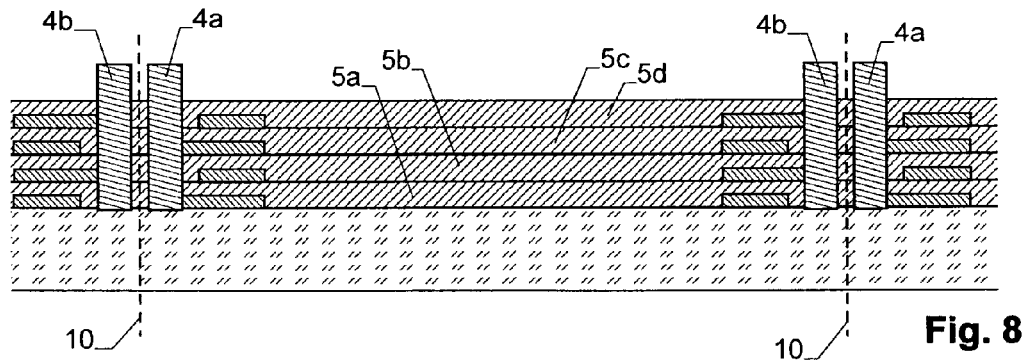
FIG. 8 is a fifth step in a manufacturing process.

After completing the layer structure of FIG. 7, the walls 4a, 4b, which have been prefabricated and are e.g. applied to a common carrier (not shown), are pushed from above into the layer structure. Since the layers 5a, 5b, . . . are of a soft material, the walls 4a, 4b enter the layers as shown in FIG. 8, whereupon the common carrier (not shown) of the walls can be removed. The walls 4a, 4b are positioned such that they contact the electrodes 3a-3e. For this purpose, as it can best be seen in FIG. 7 as well as FIGS. 1 and 2, the electrodes 3a-3e are provided with the leads 9a-9e that laterally extend away from the center of the lens in order to provide a contact with the respective wall section 4a or 4b.

Finally, the product of the above steps is separated into a plurality of electroactive lenses by severing them between the walls of adjacent lenses, e.g. along lines 10 as shown in FIG. 8. Alternatively, if substrate 7 is sufficiently soft, a separation of the lenses can e.g. also be achieved by pushing the walls 4a, 4b not only through the electroactive material layers 5a, 5b . . . , but also through the substrate 7. In yet a further alternative, the product shown in FIG. 7 can also be severed first, where-upon the walls 4a, 4b, or other means for providing a contact to the electrodes 3a-3e, are applied individually to each lens.

In above step b, the following methods can e.g. be used for applying the electroactive material layer 5a, 5b . . . :

- Spin-coating with subsequent hardening
- Spraying with subsequent hardening
- Printing (e.g. screen printing)
- Chemical vapor deposition, in particular PECVD (Plasma enhanced chemical vapor deposition)
- prefabricating the material layers and applying them on the substrate, advantageously by bonding them thereto—in this case, the layers may optionally be non-elastically stretched prior to their application in order to decrease their thickness.

The following materials can e.g. be used for the electroactive material as well as for the optical element:

- Gels (Optical Gel OG-1001 by Litway)
- Polymers (e.g. PDMS Sylgard 186 by Dow Corning, Neukasil RTV 25
- Acrylic materials (e.g. VHB 4910 by the company 3M)
- Elastomers In above step c, the following methods can e.g. be used for applying the compliant electrodes 3a-3d and, optionally, 3e:

- Ion-implantation (see "Mechanical properties of electroactive polymer microactuators with ion-implanted electrodes", Proc. SPIE, Vol. 6524, 652410 (2007);)
- PVD, CVD
- Evaporation
- Sputtering
- Printing, in particular contact printing, inkjet printing, laser printing, and screen printing.
- Field-guided self-assembly (see e.g. "Local surface charges direct the deposition of carbon nanotubes and fullerenes into nanoscale patterns", L. Seemann, A. Stemmer, and N. Naujoks, Nano Letters 7, 10, 3007-3012, 2007)
- Brushing
- Electrode plating Optionally, optical element 1 can be structured to have a desired shape in its relaxed and/or deformed states. Examples of such lenses are described below in reference to FIGS. 9 and 10. Suitable lens shapes (in the relaxed state) can e.g. be:

- Spherical lenses (convex and concave)
- Aspherical lenses (convex and concave)
- Flat
- Squares, triangles, lines or pyramids
- Any micro (e.g. micro lens array, diffraction grating, hologram) or nano (e.g. antireflection coating) structure can be integrated into the clear aperture of optical element 1 and the compliant electrode containing polymer layer.

Any of the following methods can e.g. be applied for shaping the lens:

a) Casting, in particular injection molding
b) Nano-imprinting, e.g. by hot embossing nanometer-sized structures
c) Etching (e.g. chemical or plasma)
d) Sputtering
e) Hot embossing
f) Soft lithography (i.e. casting a polymer onto a preshaped substrate)
g) Chemical self-assembly (see e.g. "Surface tension-powered self-assembly of microstructures—the state-of-the-art", R. R. A. Syms, E. M. Yeatman, V. M. Bright, G. M. Whitesides, Journal of Microelectromechanical Systems 12 (4), 2003, pp. 387-417)
h) Electro-magnetic field guided pattern forming (see e.g. "Electro-magnetic field guided pattern forming", L. Seemann, A. Stemmer, and N. Naujoks, Nano Lett., 7 (10), 3007-3012, 2007. 10.1021/nl0713373.

As will be apparent to the skilled person, some of the above methods are directly compatible with the manufacturing process described in reference to FIGS. 4-8, e.g. methods c) and d) can take place on the product shown in FIG. 7. Some other methods will require additional steps. For example, an array of convex lenses on a common carrier can be manufactured by means of methods a), b), or e)-k) and then be applied on top of the product of FIG. 7.

Several electroactive lenses of the type described above can be combined to form a multi-lens assembly.

Figure 9:
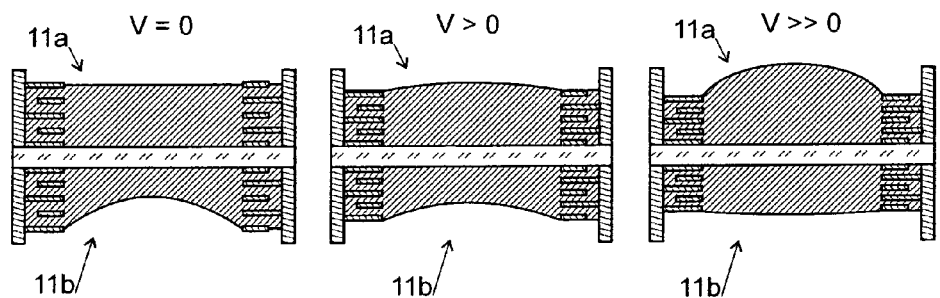
FIG. 9 shows a sectional view of an assembly of two lenses without applied voltage, with small applied voltage and with large applied voltage.

An example of such an assembly is shown in FIG. 9, where two electroactive lenses 11a, 11b are mounted to opposite sides of a solid and transparent common substrate 7. As can be seen from the left part of the figure, in the absence of an applied voltage, lens 11a has a flat surface while lens 11b is concave. While lens 11a can be manufactured e.g. as shown in FIGS. 4-8, the optical element of lens 11b has e.g. subsequently been structured by using above methods c) or d).

When a small voltage is applied, as shown in the central part of the figure, lens 11a becomes convex while lens 11b remains concave, albeit with smaller curvature. Finally, and as shown in the right part of FIG. 9, when the voltage is sufficiently large, both lenses 11a, 11b become convex.

The present lens can also be combined to even more complex structures. An example of such an assembly is shown in FIG. 10.

Figure 10:
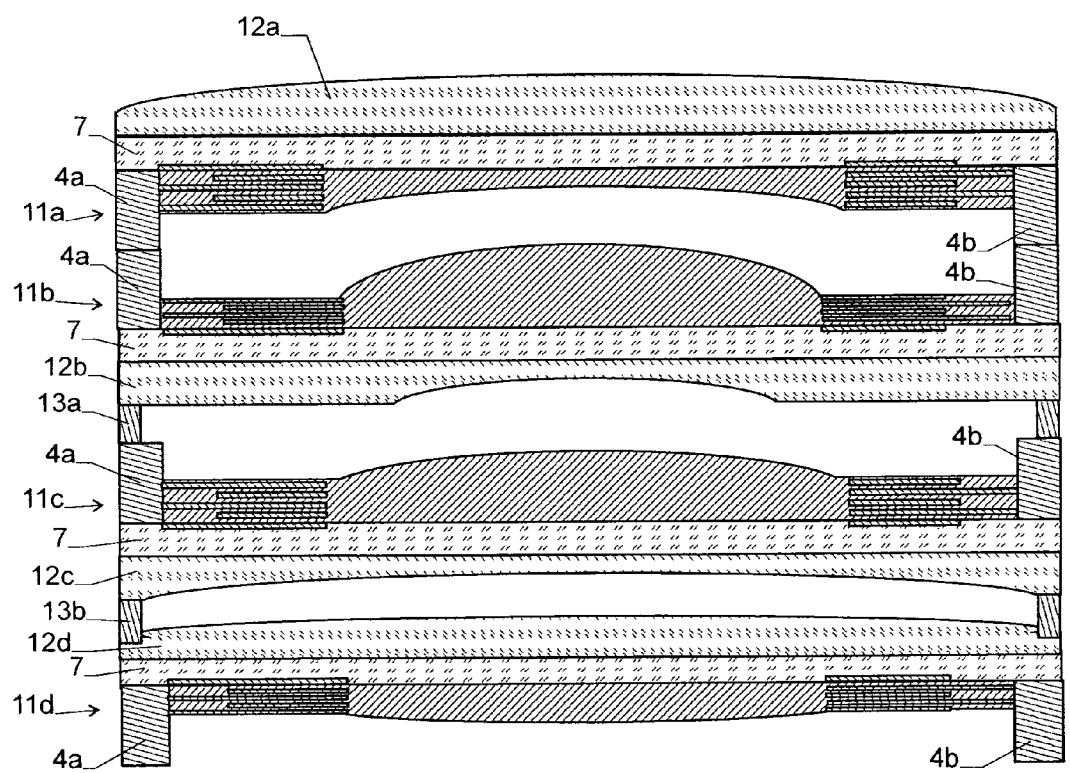
FIG. 10 shows an assembly of four stacked lenses.

The assembly of FIG. 10 comprises four electroactive lenses 11a, 11b, 11c, 11d as well as four rigid lenses 12a, 12b, 12c, 12d stacked on top of each other. The walls 4a, 4b and additional spacer elements 13a, 13b are used to keep the lenses at a correct distance from each other. In the example of FIG. 10, each electroactive lens 11a-11d is attached to one side of a substrate 7, with a rigid lens 12a-12d arranged at the opposite side of the same substrate.

In the embodiment of FIG. 10, each rigid lens is attached to a substrate 7. However, one or more of the rigid lenses may also be mounted independently of a substrate.

The shapes of the electro-active lenses 11a, 11b, 11c, 11d in the absence of a field can be defined using the structuring methods described above.

Spherical Lenses

For many applications, lenses should be spherical. To create approximately spherical lenses with the designs shown in FIGS. 1-10, the total thickness of electroactive element 2 and the optical element 1 should be fairly large. Otherwise, in particular if the electroactive layer is bonded to substrate 7, the deformation under applied voltage will be strong close to the electrodes but weak in the middle of the lens.

On the other hand, using the manufacturing process of FIGS. 4-8 requires a comparatively large number of individual layers 5a, 5b, . . . if the total thickness of optical element 1 and electroactive layer 2 is to be large, which renders the process expensive.

Figure 14:
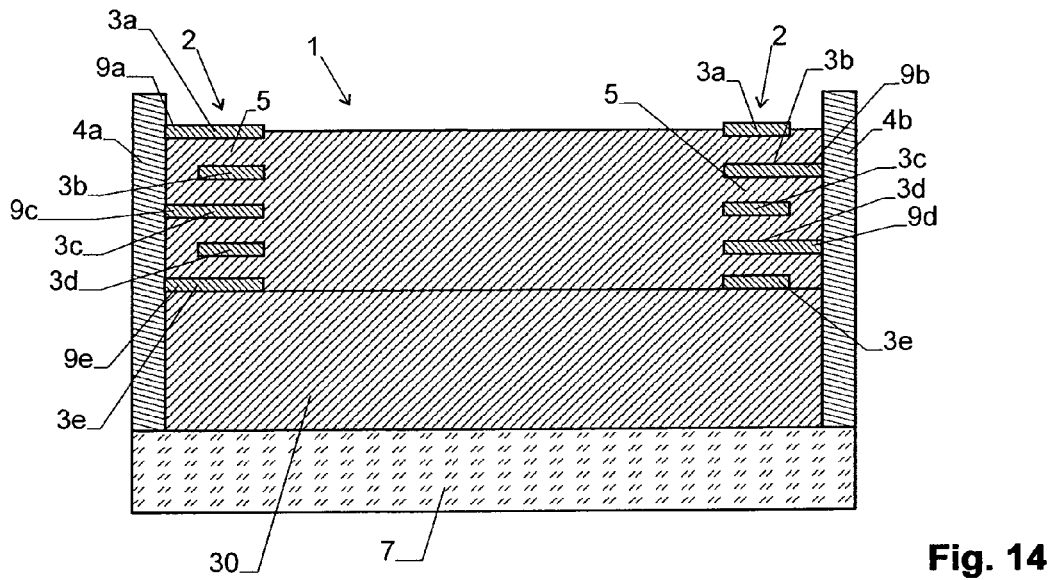
FIG. 14 shows a further embodiment of an optical device with a buffer layer.

For this reason, it is advantageous to use a design as shown in FIG. 14, where the electrodes 3a-3e are separated from substrate 7 by an elastic buffer layer 30. Buffer layer 30, which is arranged between substrate 7 on the one hand and electroactive element 2 and optical element 1 on the other hand, allows the material of optical element 1 to displace more freely, in particular in horizontal direction, i.e. it insulates the optical element 1 from the mechanical constraints of the rigid substrate 7. Therefore, advantageously, buffer layer 30 is of a comparatively soft material, i.e. it should have a Young's modulus smaller than or equal to the one of the optical element 1.

Buffer layer 30 can be fully attached to substrate 7 as well as to optical element 1, thereby connecting the two without restricting the motion of optical element 1 when a voltage is applied to the electrodes.

Figure 15:
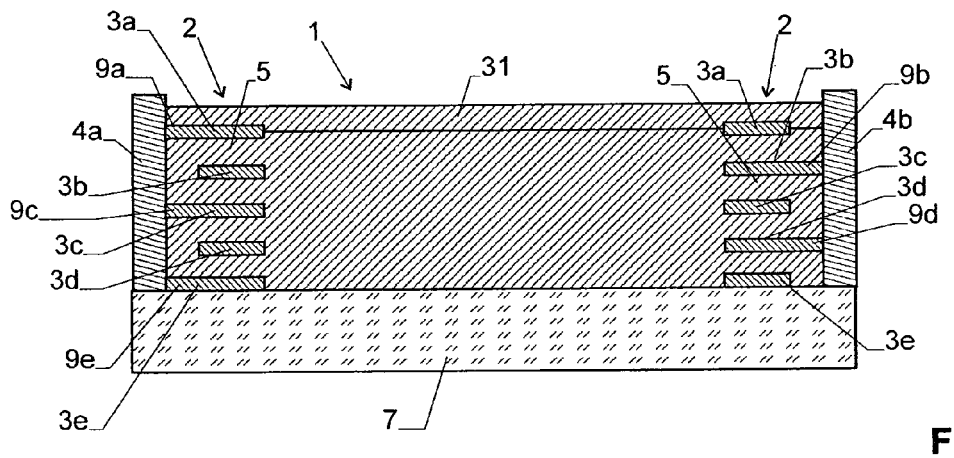
FIG. 15 shows a further embodiment of an optical device with a lid layer.

Another measure to improve the surface shape of a spherical lens, i.e. to bring it closer to an ideal spherical lens, is shown in FIG. 15. In the embodiment of FIG. 15, a lid layer 31 has been attached to the top side of optical element 1, i.e. to the side opposite substrate 7. Lid layer 31 is stiffer than optical element 1, i.e. it has a Young's modulus larger than the one of optical element 1. For a high-quality lens, particular, the Young's modulus should be about 60 times larger than the one of optical element 1. If the layer thickness is thinner, the Young's modulus has to increase to result in a good optical quality.

Figure 16:
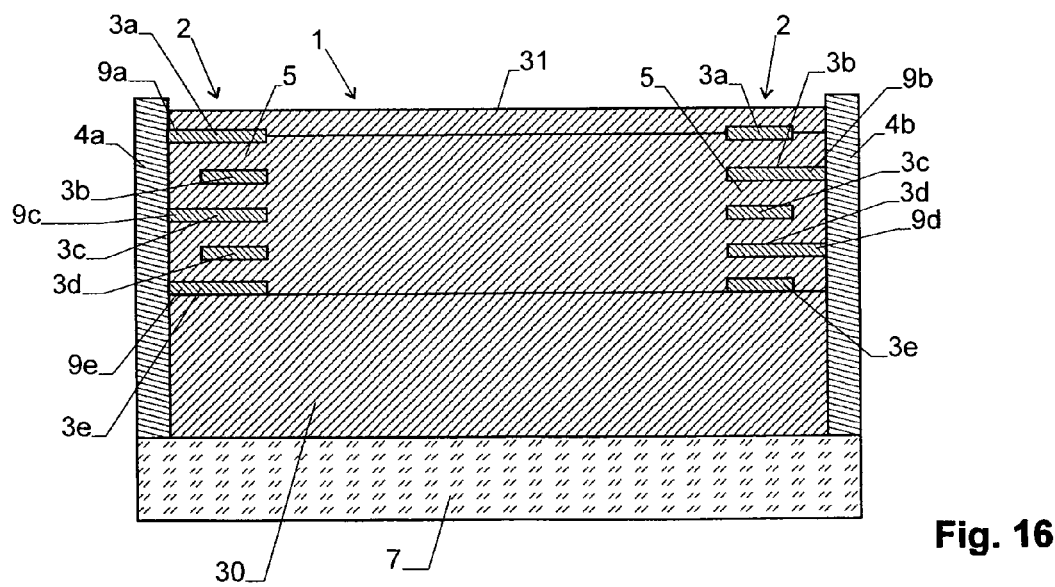
FIG. 16 shows yet a further embodiment of an optical device with a lid layer and a buffer layer.

The measures of FIGS. 14 and 15 can be combined as shown in FIG. 16, where the optical device comprises a buffer layer 30 as well as a lid layer 31.

Suitable materials for buffer layer 30 and lid layer 31 are e.g. PDMS, acrylics or polyurethans. The buffer layer has typically a Young's modulus in the range of 200 kPa or less and the lid layer has a Young's modulus of 10 MPa or more. These materials are advantageously combined with elastomer, acrylics and polyurethans for the electroactive material as well as for the lens element.

Beam Deflectors

The technologies described above can not only be applied to lenses, but to a variety of other electroactive optical devices, such as beam deflectors or anti-jittering devices.

Figure 12:
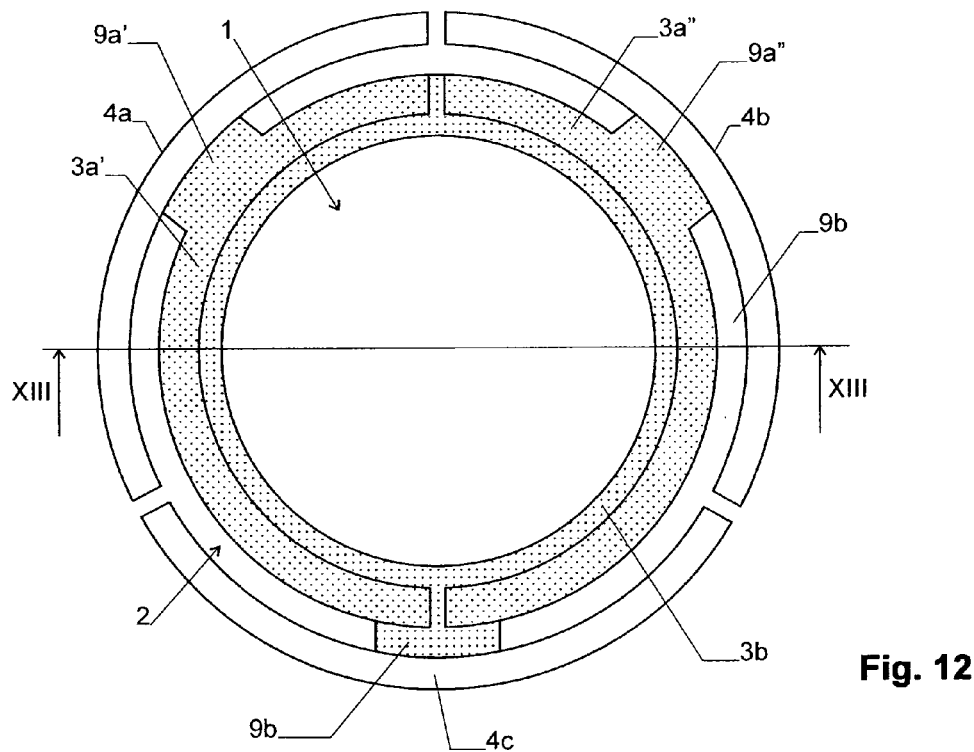
FIG. 12 shows a top view of a beam deflector.
Figure 13:
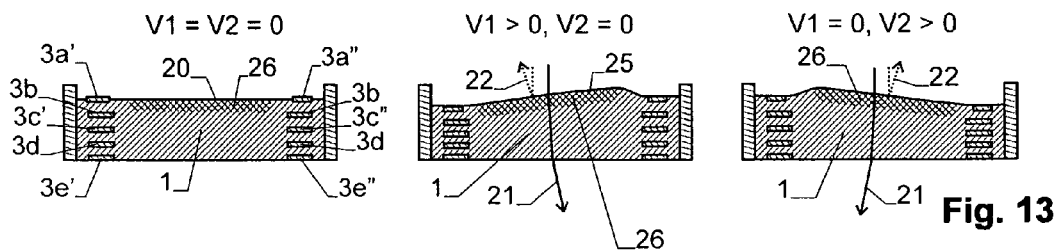
FIG. 13 shows a sectional view of the beam deflector along line XIII of FIG. 12 in three different states.

An example of a beam deflector or mirror is shown in FIGS. 12 and 13. It has basically the same set-up as the device of FIGS. 1-3 but the electrodes 3a and 3c are each split up into two electrode sections 3a' and 3a" as well as 3c' and 3c", each section extending around approximately 180° of optical element 1. Accordingly, the wall has been split up into three sections 4a, 4b, 4c, with section 4a being connected to the electrode sections 3a' and 3c', section 4b being connected to the electrode sections 3a" and 3c", and section 4c being connected to the electrode sections 3b and 3d. A voltage V1 can be applied between sections 4a and 4c, and a voltage V2 between sections 4b and 4c.

If V1=V2=0, the surface of optical element 1 is flat and horizontal as shown in the left hand part of FIG. 13. If V1≠0 and V2=0, the surface of optical element is substantially tilted to one side, while, if V1=0 and V2≠0, the surface of optical element is substantially tilted to the opposite side.

This type of device can be used as a beam deflector, either in trans-mission or reflection.

If the device is operated in transmission, a beam extending through optical element 1 can either be deflected to the left or to the right, depending on V1 and V2, as shown by the arrows 21.

If the device is operated in reflection, at least one of the surfaces of optical element 1 can be provided with a mirror element, such as a reflective coating 25 or a rigid reflective mirror plate, and a beam can either be deflected to the right or left, respectively, as shown by the dotted arrows 22.

The mirror element can, as mentioned, e.g. be a mirror plate affixed to surface 20, or it may be a coating, such as a liquid metal coating, e.g. of Galinstan.

FIG. 12 shows a beam deflector of circular shape. The shape may, however, e.g. be rectangular, with electrodes 3a' and 3a" arranged at opposite sides of the rectangle.

Other Types of Devices:

The technologies described above can be applied in yet other types of devices, such as optical phase retarders (using technologies as e.g. described in WO 2007/090843).

Also, the device can be combined with further optical elements, such as flat or curved mirrors, gratings or holograms.

Further Notes:

In the embodiments above, ring sections 4a, 4b and 4c have been used for contacting the electrodes. It must be noted, though, that different means of contact can be used as well. For example, metallic, needle-like structures can be stuck through the leads 9a, 9b, 9c for providing a common contact. Alternatively, conducting vias filled with conducting materials can be integrated into the electroactive material stack during the layer by layer process. This contacting method allows the contacting of the electrodes 3a-3e from one side of the electroactive material stack.

Furthermore, in the example of FIGS. 1-3, the electrodes 3a, 3c, 3e were commonly applied to a first potential, while the electrodes 3b, 3d were applied to a second potential. It is also possible to apply individual potentials to some or all of the electrodes in order to control the deformation electroactive element 2 more accurately.

In a particularly advantageous embodiment, one or both surfaces of optical element 1 can be provided with an antireflective layer. The layer can consist of:

"nanometer-structures", either formed in the material of optical element 1 itself or in a separate coating material. The structures have a size well below the wavelength of the light, e.g. of a size <400 nm. They can e.g. be applied by means of etching, molding, casting or embossing.

An antireflective thin layer coating.

In yet a further advantageous embodiment, the shape of the optical element 1 in its deformed state can be influenced by locally hardening or softening parts of the optical element, e.g. by UV curing or chemical treatments. An example of this embodiment is illustrated in FIG. 13, where a hatched region indicates a rigid element 26 below surface 20, which has been manufactured by local hardening and provides an improved flatness of surface 20 upon application of a voltage to the device. A rigid element can also be made of a material different from the rest of the optical element and be added to the same e.g. by embedding it or mounting it to a surface thereof. The position of the rigid element is changed when a voltage is applied to the electrodes.

In more general terms, the material of optical element 1 can have inhomogeneous hardness, in particular it can comprise an inhomogeneously polymerized polymer.

Also, optical element 1 can be an assembly of two or more materials, suitably joined together e.g. in order to correct chromatic aberrations by using two materials having differing optical dispersions.

Furthermore, optical element 1 can further be structured, e.g. by means of microstructures, such as diffractive structures or holographic structures, deformable coatings, such as reflective or anti-reflective coatings (as mentioned above) or absorptive coatings.

Some Applications:

The electroactive optical device can be used in a large variety of applications, such as:

Cameras (zoom and auto focus), such as in mobile phones, digital SLR cameras, cameras in vehicles, surveillance systems Optical part of projectors for macro- and nano-projectors in beamers and mobile phone projectors.

Industrial applications including laser cutting or welding

Microscopes, magnifying glasses

Vision correction (implanted lens in a human eye).

Endoscopes

Magnification glasses

Vision systems, such as any kind of camera

Research applications for quantum computing

Telecommunication applications (amplitude modulation)

Laser applications, such as for deflecting laser beams

TelescopesFF

Displays

While there are shown and described presently preferred embodiments of the invention, it is to be distinctly understood that the invention is not limited thereto but may be otherwise variously embodied and practiced within the scope of the following claims.

The invention claimed is:

1. An electroactive optical device comprising
an elastic optical element;
an electroactive element arranged laterally adjacent to said optical element and comprising at least one electrode pair of two electrodes with an elastic electroactive material arranged between said electrode pair;
a solid substrate; and a buffer layer arranged between said solid substrate and said electroactive element and said optical element, the buffer layer having a Young's modulus smaller than or equal to a Young's modulus of said optical element, wherein upon application of a voltage over said at least one electrode pair an axial distance between said electrodes changes, thereby varying a volume of a first region in said optical element adjacent to said electrode pair, thereby radially displacing material in said optical element between said first region and a second region of said optical element, wherein one of said regions elastically expands and the other elastically contracts in an axial direction, thereby bringing said optical element into a deformed state, while, in the absence of a voltage over said at least one electrode pair, said optical element is in an elastically relaxed state.

2. The electroactive optical device of claim 1 wherein said electroactive element comprises a plurality of electrode pairs stacked on top of each other with a plurality of gaps between said electrode pairs and wherein said gaps are filled by said electro active material.

3. The electroactive optical device of claim 1 wherein the optical element is a solid or a gel.

4. The electroactive optical device of claim 1 wherein the electroactive element comprises or consists of a material selected from the group comprising gels, polymers, acrylic materials and elastomers.

5. The electroactive optical device of claim 1 wherein the optical element is the same material as the electroactive material.

6. The electroactive optical device of claim 1 wherein the optical element is of a material different from the electroactive material.

7. The electroactive optical device of claim 1 wherein said electroactive element surrounds said optical element.

8. The electroactive optical device of claim 1 wherein said optical material is arranged at a first side of said electroactive element and wherein said electroactive optical device further comprises a solid wall at a second side of said electroactive element, wherein said second side is opposite to said first side.

9. The electroactive optical device of claim 8 wherein each of said electrodes is electrically connected to one of at least two different sections of said wall.

10. The electroactive optical device of claim 1 wherein said electroactive element comprises at least one electrode made from at least one material selected from the group comprising carbon nanotubes, carbon black, carbon grease, metal ions, fluid metals, metallic powders, conductive polymers, and rigid electrodes connected to deformable leads.

11. The electroactive optical device of claim 1 further comprising a lid layer attached to said optical element, wherein said lid layer has a Young's modulus larger than a Young's modulus of said optical element.

12. The electroactive optical device of claim 1 wherein an inner diameter of at least one of the electrodes is different from the inner diameter of at least some of the other electrodes
and wherein an electrode closest to a top surface of said optical device has a larger inner diameter than a next lower electrode, wherein the top surface is the surface that is deformed upon application of a voltage.

13. The electroactive optical device of claim 1 further comprising a mirror element on at least one surface of said optical element.

14. The electroactive optical device of claim 1 further comprising a rigid element in the optical element.

15. The electroactive optical device of claim 1 further comprising an antireflective layer on at least one surface of said optical element.

16. The electroactive optical device of claim 1 wherein said optical element is of an inhomogeneous hardness and wherein said optical element comprises an inhomogeneously polymerized polymer.

17. An assembly of at least two electroactive devices of claim 1 on top of each other, wherein said electroactive devices are mounted to opposite sides of a common solid substrate.

18. The electroactive optical device of claim 1 wherein said elastic optical element forms a lens.

19. An electroactive optical device comprising
an elastic optical element;
an electroactive element arranged laterally adjacent to said optical element and comprising at least one electrode pair of two electrodes with an elastic electroactive material arranged between said electrode pair;
a solid substrate;
a buffer layer arranged between said solid substrate and said electroactive element and said optical element, the buffer layer having a Young's modulus smaller than or equal to a Young's modulus of said optical element; and
a lid layer attached to said optical element, the lid layer having a Young's modulus larger than the Young's modulus of said optical element,
wherein upon application of a voltage over said at least one electrode pair an axial distance between said electrodes changes, thereby varying a volume of a first region in said optical element adjacent to said electrode pair, thereby radially displacing material in said optical element between said first region and a second region of said optical element, wherein one of said regions elastically expands and the other elastically contracts in an axial direction, thereby bringing said optical element into a deformed state, while, in the absence of a voltage over said at least one electrode pair, said optical element is in an elastically relaxed state, and
wherein said electroactive element comprises a plurality of electrode pairs stacked on top of each other with a plurality of gaps between said electrode pairs and wherein said gaps are filled by said electroactive material.

20. An electroactive optical device comprising
an elastic optical element;
an electroactive element arranged laterally adjacent to said optical element and comprising at least one electrode pair of two electrodes with an elastic electroactive material arranged between said electrode pair; and
a lid layer attached to said optical element, said lid layer having a Young's modulus larger than a Young's modulus of said optical element,
wherein upon application of a voltage over said at least one electrode pair an axial distance between said electrodes changes, thereby varying a volume of a first region in said optical element adjacent to said electrode pair, thereby radially displacing material in said optical element between said first region and a second region of said optical element, wherein one of said regions elastically expands and the other elastically contracts in an axial direction, thereby bringing said optical element into a deformed state, while, in the absence of a voltage over said at least one electrode pair, said optical element is in an elastically relaxed state.

* * * * *